US012619290B2

(12) United States Patent
Lin

(10) Patent No.: US 12,619,290 B2
(45) Date of Patent: May 5, 2026

(54) FIXING BRACKET FOR FACILITATING ASSEMBLY AND DISASSEMBLY OF HARD DISK IN ELECTRONIC DEVICES

(71) Applicant: Fulian Precision Electronics (Tianjin) Co., LTD., Tianjin (CN)

(72) Inventor: Jia-Feng Lin, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 182 days.

(21) Appl. No.: 18/544,801

(22) Filed: Dec. 19, 2023

(65) Prior Publication Data

US 2025/0021142 A1     Jan. 16, 2025

(30) Foreign Application Priority Data

Jul. 12, 2023    (CN) ......................... 202310863181.X

(51) Int. Cl.
*G06F 1/18*         (2026.01)
*G06F 1/187*        (2026.01)

(52) U.S. Cl.
CPC .................................... *G06F 1/187* (2013.01)

(58) Field of Classification Search
CPC ............................. G06F 1/187; G11B 33/124
See application file for complete search history.

(56) References Cited

U.S. PATENT DOCUMENTS 9,152,189 B2 * 10/2015  Fan ......................... G06F 1/187
2009/0101781 A1 *  4/2009  Peng .................... G11B 33/124
                                                        248/316.1

* cited by examiner

*Primary Examiner* — James Wu
(74) *Attorney, Agent, or Firm* — ScienBiziP, P.C.

(57) ABSTRACT

A fixing bracket including a bracket body having a slot for accommodating a hard disk; a movable fastener including swinging arms with a first portion, a second portion, and a third portion, the third portion being connected between the first and second portions, a reciprocating piece movably set on the bracket body, and shafts mounted on the bracket body, wherein the first portion is rotatably connected to one side of the reciprocating piece, the second portion is rotatably mounted around the shafts, and the third portion is oriented towards the slot.

17 Claims, 7 Drawing Sheets

FIXING BRACKET FOR FACILITATING ASSEMBLY AND DISASSEMBLY OF HARD DISK IN ELECTRONIC DEVICES

FIELD

The subject matter herein generally relates to mounting mechanisms for electronic components, and more particularly, to a fixing bracket for facilitating assembly and disassembly of efficient hard disk in electronic devices.

BACKGROUND

Hard disks need to be secured in electronic devices, such as server racks, by fixing brackets. An existing fixing bracket may use screws for securing the hard disk, but this securing method reduces the efficiency when assembling the hard disk to and disassembling the hard disk from the electronic device.

BRIEF DESCRIPTION OF THE DRAWINGS

Implementations of the present technology will now be described, by way of example only, with reference to the attached figures.

DETAILED DESCRIPTION

Figure 1:
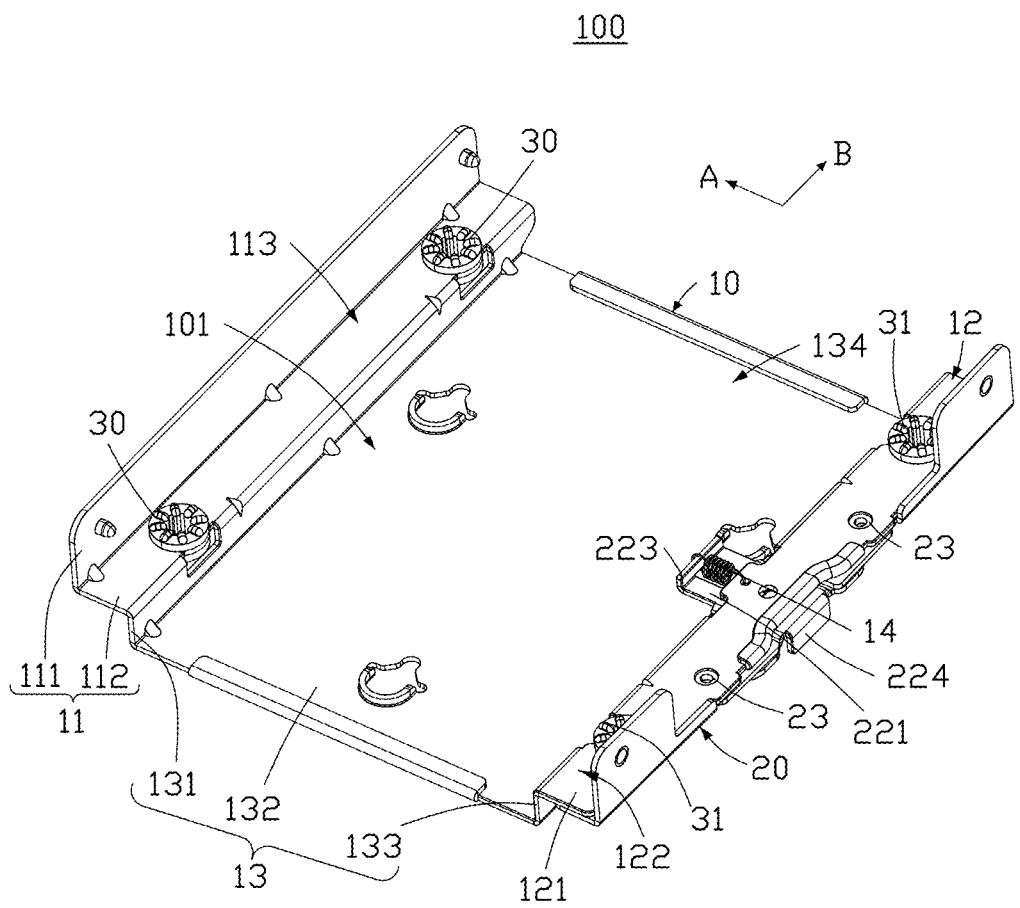
FIG. 1 is diagrammatic view of a fixing bracket according to an embodiment of the present application.

It will be appreciated that for simplicity and clarity of illustration, where appropriate, reference numerals have been repeated among the different figures to indicate corresponding or analogous members. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to;" it specifically indicates open-ended inclusion or membership in the so-described combination, group, series, and the like.

Figure 5:
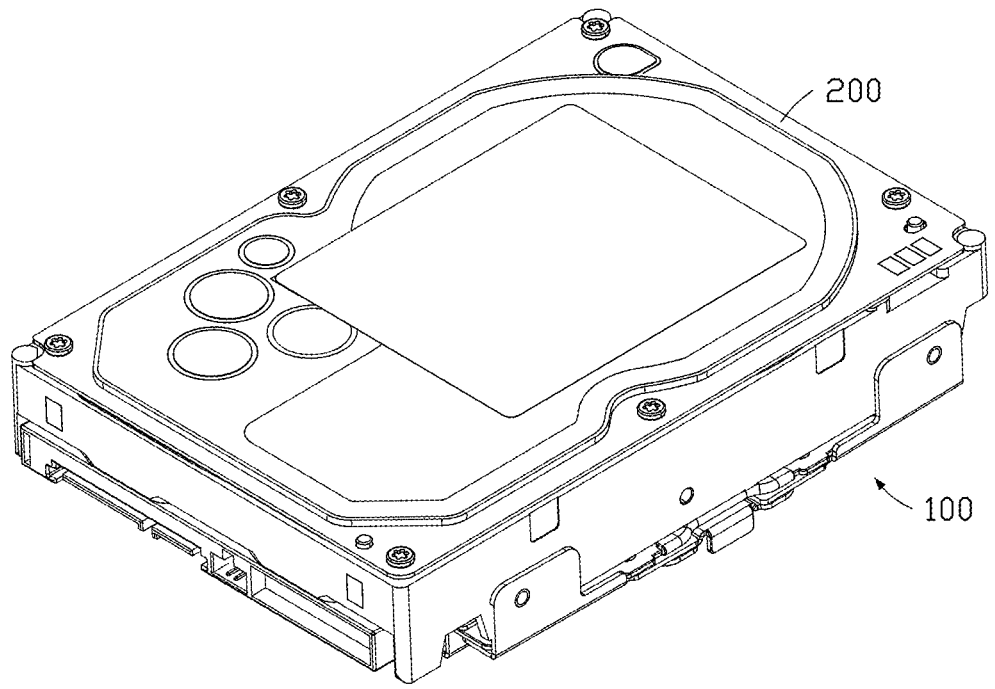
FIG. 5 is a diagrammatic view of the fixing bracket in FIG. 1 with a hard disk installed therein.

Referring to FIGS. 1 and 5, an embodiment of a fixing bracket 100 is provided. The fixing bracket 100 can be used in server cabinets for securing hard disks 100. In other embodiments, the fixing bracket 100 can also be applied in other electronic devices securing such as desktop computers.

Moreover, the fixing bracket 100 can also be used for securing components other than the hard disks 200, such as power supplies, motherboards, cameras, etc.

Referring to FIGS. 1 to 7, the fixing bracket 100 includes a bracket body 10 and a movable fastener 20 arranged on the bracket body 10. The bracket body 10 is provided with a slot 101 for accommodating the hard disk 200. The movable fastener 20 is used to press against the hard disk 200 to rapidly secure the hard disk 200 within the slot 101

The bracket body 10 is generally square in shape. The bracket body 10 includes a first limiting piece 11, a second limiting piece 12, and a connecting piece 13. The first limiting piece 11 and the second limiting piece 12 are spaced apart from each other. The connecting piece 13 is connected between the first limiting piece 11 and the second limiting piece 12. The first limiting piece 11, the connecting piece 13, and the second limiting piece 12 cooperatively form the slot 101. The direction from the first limiting piece 11, to the second limiting piece 12 is defined as a first direction A, and the extending direction of the first limiting piece 11 or the second limiting piece 12 is defined as a second direction B.

The movable fastener 20 includes two swinging arms 21, a reciprocating piece 22, and two shafts 23. The two swinging arms 21 are arranged apart along the second direction B on the second limiting piece 12. Each of two opposite side of the reciprocating piece 22 is movably connected to an end portion of a corresponding one of the swinging arms 21. The two shafts 23 are spaced apart on the second limiting piece 12. Each shaft 23 passing through a corresponding one of the swinging arms 21, allowing the swinging arm 21 to rotate around the shaft 23. The reciprocating piece 22 is movable along the first direction A on the second limiting piece 12.

Figure 6:
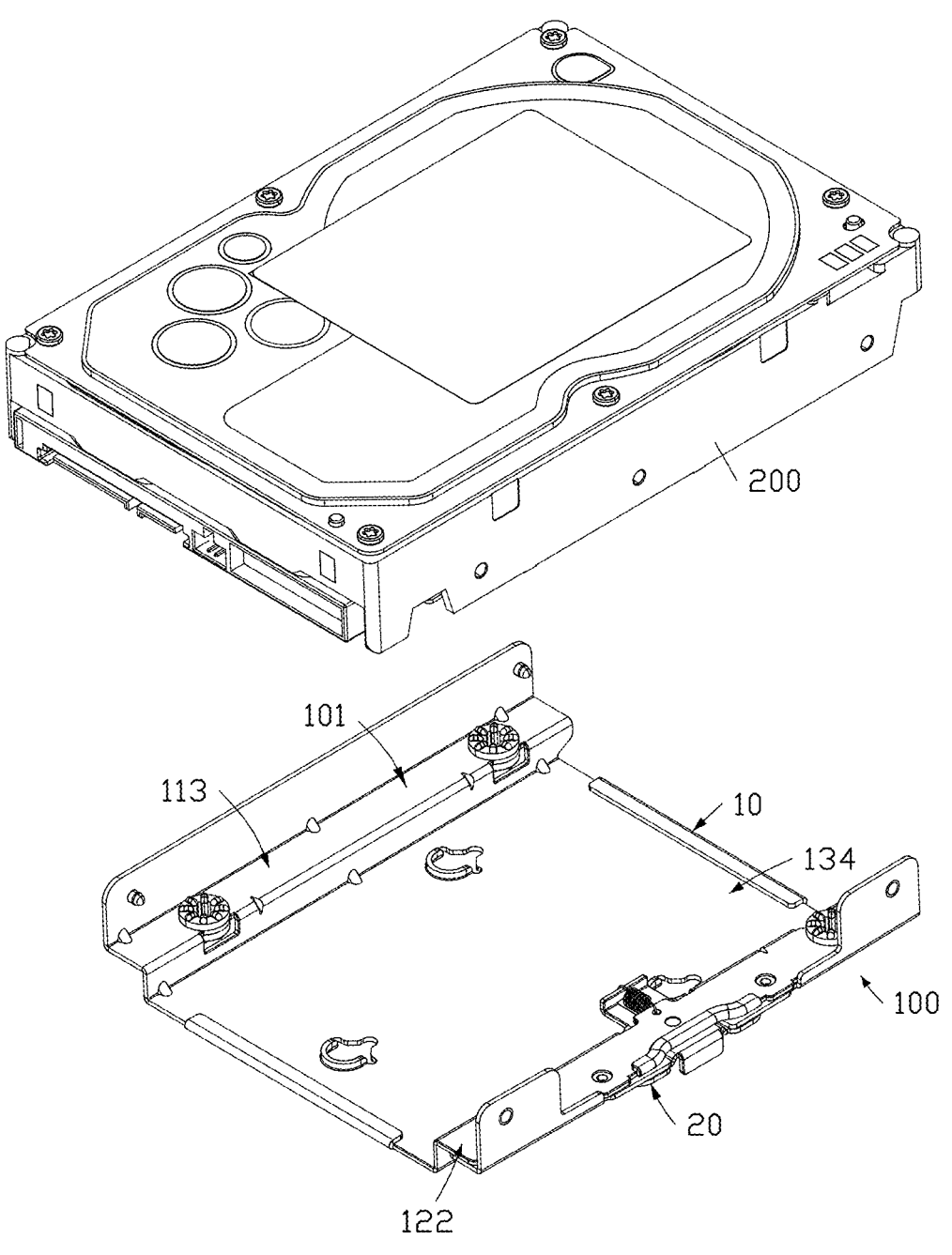
FIG. 6 is a diagrammatic view of the fixing bracket in FIG. 1 before a hard disk is installed therein.
Figure 7:
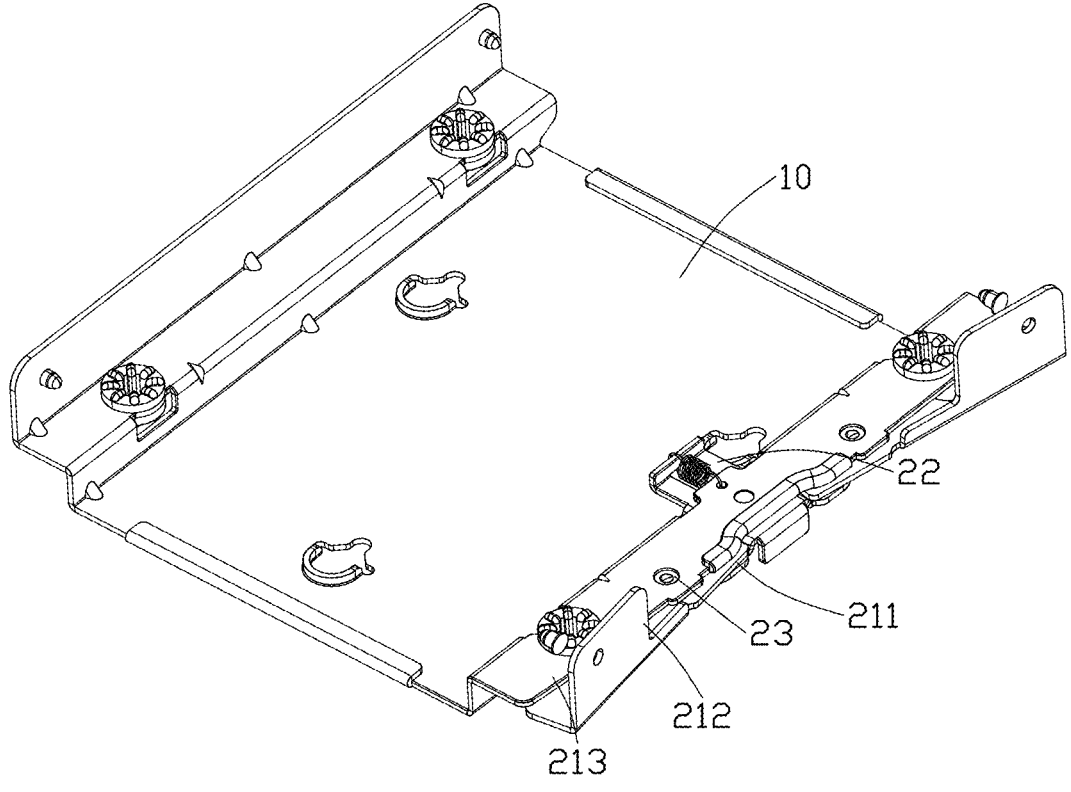
FIG. 7 is similar to FIG. 1, but showing a swinging arm is rotated.

Referring to FIGS. 5 and 6, the process of securing the hard disk 200 onto the fixing bracket 100 is carried out by first placing the hard disk 200 in the slot 101, and then pulling the reciprocating piece 22 away from the slot 101. At the same time, the reciprocating piece 22 drives the swinging arms 21 to rotate in a positive direction, e.g., a clockwise direction, causing the end portions of the swinging arms 21 away from the reciprocating piece 22 to press against the hard disk 200, thereby securing the hard disk 200 in the slot 101. The process of separating the hard disk 200 from the fixing bracket 100 is carried out by first pushing the reciprocating piece 22 towards the slot 101. Simultaneously, the reciprocating piece 22 drives the swinging arms 21 to rotate in the opposite direction, e.g., the counterclockwise direction, causing the end portions of the swinging arms 21 away from the reciprocating piece 22 to move away from the hard disk 200, thus separating the hard disk 200 from the slot 101.

The fixing bracket 100 with above configuration enables the swinging arms 21 to rotate around the shafts 23. The rotating swinging arms 21 can tightly press against the hard disk 200, thus allowing the rapid assembly of the hard disk 200 onto or disassembly of the hard disk 200 from the fixing bracket 100.

Figure 2:
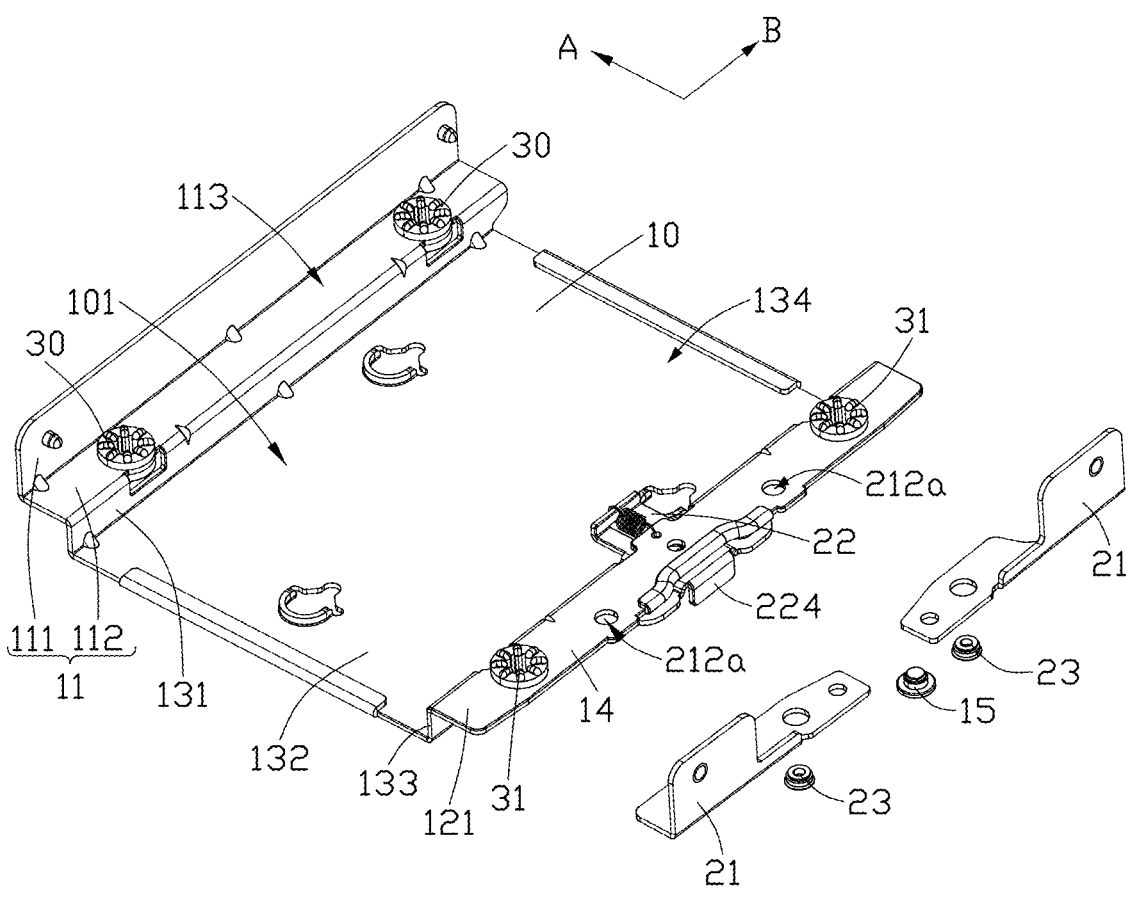
FIG. 2 is a partial exploded view of the fixing bracket in FIG. 1.

Referring to FIGS. 1 and 2, in this embodiment, the first limiting piece 11 of the fixing bracket 100 is approximately L-shaped. The first limiting piece 11 includes a first plate 111 and a second plate 112. One side of the first plate 111 is vertically connected to the second plate 112 to form a first accommodating space 113, which can be used to accommodate one end of the hard disk 200. The second limiting piece 12 includes a third plate 121. The two swinging arms 21 are spaced from each other along the second direction B on the third plate 121 to form a second accommodating space 122, which can be used to accommodate the other end of the hard disk 200. Thus, the two opposite end portions of the hard disk 200 are limited by the first limiting piece 11, the second limiting piece 12, and the swinging arms 21.

Referring to FIGS. 1 and 2, in this embodiment, the fixing bracket 100 further includes multiple first buffer pads 30 and multiple second buffer pads 31. The first buffer pads 30 are set on the side of the second plate 112 facing the first accommodating space 113, and the second buffer pads 31 are set on the side of the third plate 121 facing the second accommodating space 122. The first buffer pads 30 and the second buffer pads 31 are made of flexible rubber material, which can support the hard disk 200 and protect the hard disk 200 from vibration.

Referring to FIG. 1 and FIG. 2, in this embodiment, the connecting piece 13 is generally U-shaped. The connecting piece 13 including a fourth plate 131, a fifth plate 132, and a sixth plate 133. The fifth plate 132 and the sixth plate 133 are spaced apart, with the fourth plate 131 connecting between the fifth plate 132 and the sixth plate 133 to form a third accommodating space 134. The third accommodating space 134 corresponds to the hard disk 200. The fourth plate 131 connects vertically to the fifth plate 132 and the sixth plate 133. The fifth plate 132 connects to the second plate 112, and the sixth plate 133 connects to the third plate 121. The first accommodating space 113, the second accommodating space 122, and the third accommodating space 134 cooperatively form the slot 101.

Figure 3:
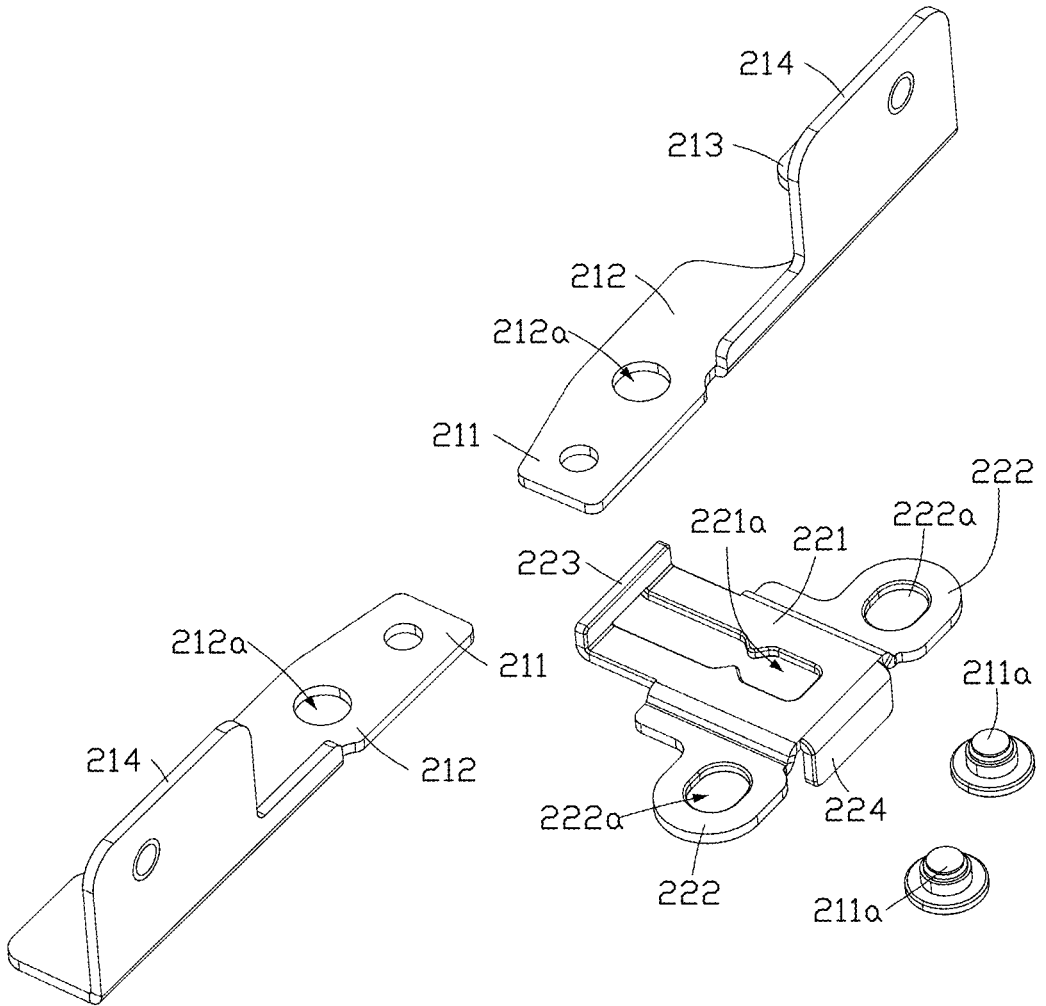
FIG. 3 is an exploded view of a movable fastener of the fixing bracket in FIG. 1.

Referring to FIGS. 2 and 3, in this embodiment, each swinging arm 21 includes a first portion 211, a second portion 212, and a third portion 213. The second portion 212 is connected between the first portion 211 and the third portion 213. The first portion 211 is rotatably connected to one side of the reciprocating piece 22. The second portion 212 defines a through hole 212a for the shaft 23 to pass through. The third portion 213 is approximately L-shaped, with a part of the third portion 213 facing the second accommodating space 122. In this embodiment, the first portion 211, the second portion 212, and the third portion 213 are integrally formed, thereby enhancing the overall durability and stability of the swinging arms 21.

Referring to FIGS. 2 and 3, in this embodiment, at a junction of the third plate 121 and the sixth plate 133, there is an opening 14 that connects to the third accommodating space 134. The reciprocating piece 22 includes a first board 221, two ears 222, a fixing board 223, and a second board 224. The two ears 222 are respectively set on two opposite sides of the first board 221. The fixing board 223 and the second board 224 are respectively set at the other two opposite ends of the first board 221. The fixing board 223 extends from one end of the first board 221 in a substantially perpendicular direction, and the second board 224 extends from the opposite end of the first board 221 in a substantially perpendicular direction. The fixing board 223 and the second board 224 is staggered form each other. The first board 221 can move through the opening 14. The fixing board 223 is set within the placement slot 101, and the size of the fixing board 223 is larger than that of the opening 14, thus preventing the reciprocating piece 22 from being pulled out of the opening 14. The second board 224 is set outside the placement slot 101, facilitating the pushing and pulling of the reciprocating piece 22. The ears 222 are connected to the first portion 211 of the swinging arm 21 through a hinge structure (not shown), enabling a rotational connection between the reciprocating piece 22 and the first portion 211.

Referring to FIGS. 2 and 3, the ears 222 define sliding holes 222a, and the reciprocating piece 22 further includes a guiding post 211a. One end portion of the guiding post

211a is connected to the first portion 211, and the other end portion of the guiding post 211a can move through the sliding hole 222a. An inner diameter of the sliding hole 222a is larger than an outer diameter of the guiding post 211a, ensuring a smooth connection between the first portion 211 and the ears 222. In this embodiment, the guiding post 211a is a cap-shaped nail, with a smaller head of the guiding post 211a movable set within the sliding hole 222a and a larger head abutted against a surface of the ear 222 around the sliding hole 222a.

Figure 4:
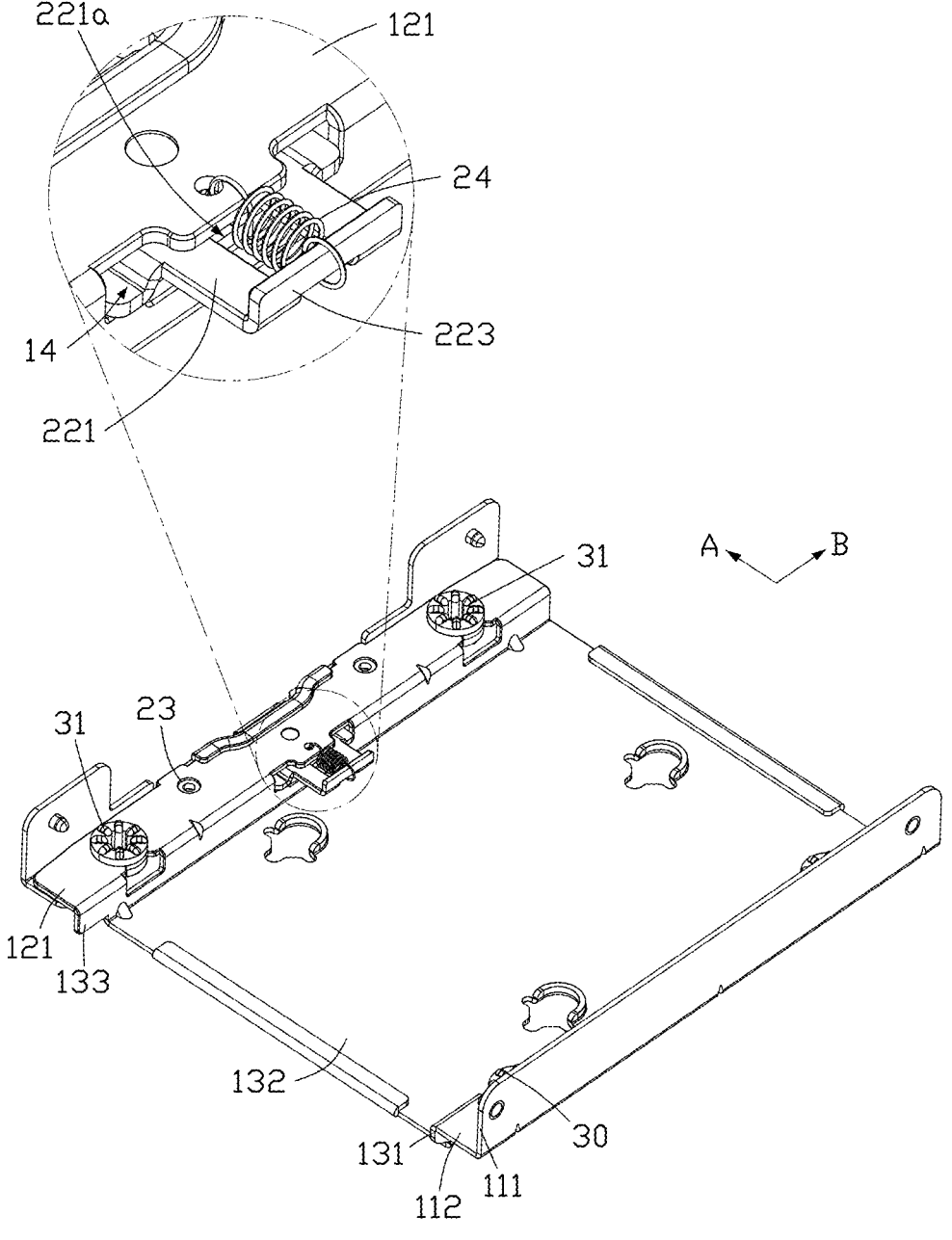
FIG. 4 is similar to FIG. 1, but showing the fixing bracket from another angle.

Referring to FIGS. 3 and 4, in this embodiment, the movable fastener 20 further includes an elastic component 24. One end of the elastic component 24 is connected to the third plate 121, and the other end of the elastic component 24 is connected to the fixing board 223 of the reciprocating piece 22. When in use, as the first board 221 moves towards the second accommodating space 122, the elastic component 24 stretches and accumulates elastic potential energy. When the first board 221 moves away from the second accommodating space 122, the elastic component 24 recovers and releases the elastic potential energy. This energy acts on the first board 221, enabling the first board 221 to quickly move away from the second accommodating space 122, simultaneously driving the swinging arms 21 to rapidly rotate, thereby pressing the third portion 213 of the swinging arm 21 against the hard disk 200 for rapid securing. In this embodiment, the elastic component 24 is a spring.

Referring to FIGS. 2 and 3, in this embodiment, the first board 221 is arranged on one side of the third plate 121 away from the second accommodating space 122. The first portion 211 and the second portion 212 also arranged on the side of the third plate 121 away from the second accommodating space 122. The shaft 23 is disposed on the side of the third plate 121 away from the second accommodating space 122, with the shaft 23 passing through the through-hole 212a of the second portion 212, allowing the second portion 212 to rotate around the shaft 23 on the side of the third plate 121 away from the second accommodating space 122.

Referring to FIGS. 2 and 3, in this embodiment, the third portion 213 includes a card plate 214 facing the first plate 111, which can be used to press against the hard disk 200. When the reciprocating piece 22 is pulled out, the card plate 214 moves towards the hard disk 200 and then presses tightly against the hard disk 200. Additionally, by setting the first portion 211 and the second portion 212 on the side of the third plate 121 away from the second accommodating space 122, it avoids occupying the second accommodating space 122, ensuring that a placement area for the hard disk 200 remains unaffected. In this embodiment, the shaft 23 is a cap-shaped nail, with a smaller head of the shaft 23 capable of passing through the through-hole 212a, while a larger head is disposed against the through-hole 212a.

Referring to FIGS. 2, 3, and 4, in this embodiment, the bracket body 10 further includes a limiting column 15. The limiting column 15 is disposed on a side of the third plate 121 away from the second accommodating space 122. The first board 221 defines a limiting slot 221a extending approximately along the first direction A. The limiting column 15 passes through the limiting slot 221a, and is movably disposed within the limiting slot 221a, thereby restricting a movement of the first board 221 along the first direction A.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A fixing bracket comprising:

a bracket body defining a slot for accommodating a hard disk; and a movable fastener comprising:

a plurality of swinging arms, each of the plurality of swinging arms comprising a first portion, a second portion, and a third portion, the second portion being connected between the first portion and third portion;

a reciprocating piece movably disposed on the bracket body; and a plurality of shafts mounted on the bracket body, wherein the first portion is rotatably connected to one side of the reciprocating piece, the second portion is rotatably connected to one of the plurality of shafts, and the third portion extends towards the slot;

the bracket body comprises a first limiting piece, a second limiting piece, and a connecting piece, the first limiting pieces and the second limiting piece are spaced apart from each other, the connecting piece is connected between the first limiting pieces and the second limiting piece, the first limiting pieces, the connecting piece, and the second limiting piece cooperatively form the slot;

the first limiting piece comprises a first plate and a second plate, the first plate is connected to the second plate to form a first accommodating space configured for accommodating one end portion of the hard disk;

the second limiting piece comprises a third plate, the plurality of swinging arms is connected to the third plate to form a second accommodating space configured for accommodating another end portion of the hard disk, and the second accommodating space corresponds to the first accommodating space.

2. The fixing bracket of claim 1, further comprising a plurality of first buffer pads, wherein the plurality of first buffer pads is arranged on one side of the second plate facing the first accommodating space.

3. The fixing bracket of claim 2, further comprising a plurality of second buffer pads, wherein the plurality of second buffer pads is arranged on one side of the third plate facing the second accommodating space.

4. The fixing bracket of claim 1, wherein the connecting piece comprises a fourth plate, a fifth plate, and a sixth plate, the fifth plate and the sixth plate are spaced apart from each other, the fourth plate is connected between the fifth plate and sixth plate, the fifth plate is connected to the second plate, and the sixth plate is connected to the third plate.

5. The fixing bracket of claim 4, wherein an opening is defined at a junction of the third plate and the sixth plate, and the reciprocating piece is movably disposed on the opening.

6. The fixing bracket of claim 1, wherein the third portion comprises a card plate facing the first plate, and the card plate is configured to press against the hard disk.

7. The fixing bracket of claim 6, wherein the movable fastener further comprises an elastic component, one end portion of the elastic component is connected to the third plate, and another end portion of the elastic component is connected to the reciprocating piece.

8. The fixing bracket of claim 7, wherein the elastic component is a spring.

9. The fixing bracket of claim 7, wherein the bracket body further comprises a limiting column, the limiting column is set on one side of the third plate away from the second accommodating space, the reciprocating piece defines a limiting slot, the limiting column movably passes through the limiting slot.

10. The fixing bracket of claim 7, wherein the reciprocating piece comprises a first board and an ear connected to the first board, and the first board is movably inserted through the opening.

11. The fixing bracket of claim 10, wherein the reciprocating piece further comprises a guiding post, the ear defines a sliding hole, one end portion of the guiding post is connected to the first portion, and another end portion of the guiding post passes through the sliding hole.

12. The fixing bracket of claim 11, wherein an inner diameter of the sliding holes is larger than an outer diameter of the guiding post.

13. The fixing bracket of claim 11, wherein the guiding post comprises a smaller head and a larger head, the smaller head is movable arranged within the sliding hole, and the larger head is abutted against a surface of the ear around the sliding hole.

14. The fixing bracket of claim 10, wherein the reciprocating piece further comprises a second board connected to one end portion of the first board, and the second board is staggered from the ears.

15. The fixing bracket of claim 10, wherein the reciprocating piece further comprises a fixing board connected to another end portion of the first board, an extension direction of the fixing board is opposite to an extension direction of the second board, and the end portion of the elastic component is connected to the fixing board.

16. The fixing bracket of claim 1, wherein one end of each of the plurality of shafts is fixedly disposed on one side of the third plate away from the second accommodating space, the second portion defines a through hole, and another end of each of the plurality of shafts passes through the through-hole.

17. The fixing bracket of claim 1, wherein the first portion, the second portion, and the third portion are integrally formed.

* * * * *